(12) United States Patent
Namikawa et al.

(10) Patent No.: US 8,791,659 B2
(45) Date of Patent: Jul. 29, 2014

(54) MOTOR CONTROL UNIT AND ELECTRIC POWER STEERING SYSTEM

(75) Inventors: Isao Namikawa, Kariya (JP); Terutaka Tamaizumi, Okazaki (JP); Yuji Kariatsumari, Yamatotakada (JP)

(73) Assignee: JTEKT Corporation, Osaka-shi (JP)

( * ) Notice: Subject to any disclaimer, the term of this patent is extended or adjusted under 35 U.S.C. 154(b) by 180 days.

(21) Appl. No.: 13/570,857

(22) Filed: Aug. 9, 2012

(65) Prior Publication Data

US 2013/0049652 A1 Feb. 28, 2013

(30) Foreign Application Priority Data

Aug. 22, 2011 (JP) ................... 2011-180669

(51) Int. Cl.
*H02P 21/14* (2006.01)
*H02P 6/00* (2006.01)
(52) U.S. Cl.
CPC ...................... *H02P 6/00* (2013.01)
USPC ................. 318/400.02; 318/400.01; 318/700

(58) Field of Classification Search
CPC ......................................... H02P 6/00
USPC .................. 318/400.02, 400.01, 700
See application file for complete search history.

(56) References Cited

U.S. PATENT DOCUMENTS 7,474,067 B2 * 1/2009 Ueda et al. ................... 318/432
2010/0235051 A1 9/2010 Kariatsumari et al.

* cited by examiner

*Primary Examiner* — David Luo
(74) *Attorney, Agent, or Firm* — Oliff PLC (57) ABSTRACT

A F/B gain control unit computes a first change component by executing torque feedback control based on a torque deviation using a feedback gain that is computed by a F/B gain variable control unit. The F/B gain variable control unit computes one of two different feedback gains that correspond to a "first computation mode" in which the first change component is used as an addition angle and a "second computation mode" in which a value obtained by correcting the first change component by an estimated motor rotation angular velocity is used as the addition angle, respectively. A feedback gain used in the first computation mode is set such that a response at the feedback gain is higher than that at a feedback gain used in the second computation mode.

3 Claims, 8 Drawing Sheets

MOTOR CONTROL UNIT AND ELECTRIC POWER STEERING SYSTEM

INCORPORATION BY REFERENCE/RELATED ART APPLICATION

This application claims priority to Japanese Patent Application No. 2011-180669 filed on Aug. 22, 2011 the disclosure of which, including the specification, drawings and abstract, is incorporated herein by reference in its entirety.

BACKGROUND OF THE INVENTION

1. Field of the Invention

The invention relates to a motor control unit and an electric power steering system.

2. Discussion of Background

There is a conventional vehicle steering system such as an electric power steering system (EPS) that includes a motor control unit that is capable of controlling a brushless motor without detecting a rotation angle of the brushless motor. As a sensorless (resolver-less) drive control method in which a rotation angle sensor (motor resolver) is not used, the following method has been proposed. According to the method, an addition angle that corresponds to an amount of change in the motor rotation angle (hereinafter, referred to as "motor rotation angle change amount" where appropriate) in each computation period is computed, and current feedback control is executed on a rotating coordinate system that rotates in accordance with a motor rotation angle (control tingle) used in control, which is obtained by adding up the addition angles.

For example, a motor control unit described in US2010/0235051 executes torque feedback control based on a torque deviation (deviation between a target steering torque and an actual steering torque) that indicates the excess or deficiency of the actual torque relative to die target torque that should he generated by a motor, and computes a value obtained through the torque feedback control as an addition angle. Further, the motor control unit estimates a motor rotation angular velocity that corresponds to a motor rotation angle change amount based on an induced voltage. Under a predetermined condition, the value that is obtained through execution of the torque feedback control is corrected based on the estimated motor rotation angular velocity, and the corrected value is computed as the addition angle. In this way, it is possible to execute motor control with a higher accuracy.

The value of the addition angle is brought to a value close to a motor rotation angle change amount that should he achieved, through the correction based on the estimated motor rotation angle as described above. Because the torque deviation is reduced through the correction, a gain of the torque feedback control is preferably set to a low value so that generation of self-excited vibration due to excessive response is suppressed.

On the other hand, when the correction based on the estimated motor rotation angle is not executed, an addition angle is likely to be deviated from a motor rotation angle change amount that should be achieved Therefore, a torque deviation may be increased. Especially, in resolver-Jess control that is executed in accordance with a control angle that is an imaginary motor rotation angle used in the control, the deviation between the control angle and the actual rotation angle may be temporarily increased beyond a range of deviations at which a rotor of a motor is kept at a rotation position that corresponds to the control angle. Therefore, in order to achieve prompt recovery from such a state, a gain of the torque feedback control is required to be set to a high value to increase the response (followability).

However, in the related art described above, although the gain of the torque feedback control is variable based on the addition angle (absolute value) that is ultimately computed, whether the addition angle is corrected based on the estimated motor rotation angle is not taken into account. Therefore, the response is likely to be excessively high or low depending on whether the correction is made. As a result, the stability of the motor control may be reduced.

SUMMARY OF THE INVENTION

The invention provides a motor control unit and an electric power steering system that are capable of executing resolver-less control more stably while ensuring high quietness.

According to a feature of an example of the invention, in a motor control unit that executes torque feedback control based on a torque deviation (deviation between a target steering torque and an actual steering torque) that indicates the excess or deficiency of the actual torque relative to the target torque that should he generated by a motor and computes a value obtained through the torque feedback control as an addition angle, a gain of the torque feedback control is changed depending on the mode of computation of the addition angle. In this way, it is possible to more stably execute resolver-less control while maintaining high quietness.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
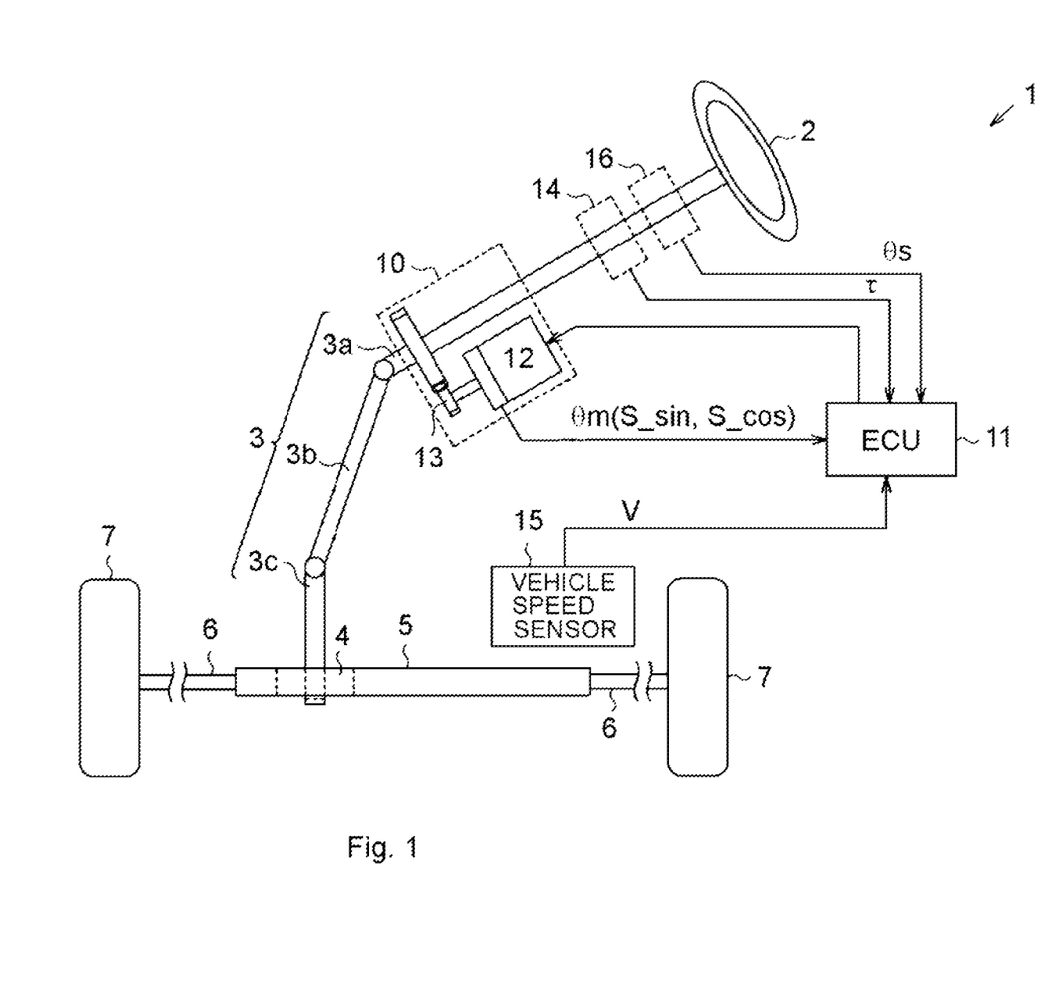
FIG. 1 is a view schematically showing the configuration of an electric power steering system (EPS)

As shown in FIG. 1, in an electric power steering system (EPS) 1 according to an embodiment of the invention, a steering shaft 3 to which a steering wheel 2 is fixed is coupled to a rack shaft 5 via a rack-and-pinion mechanism 4. The rotation of the steering shaft 3 caused in response to a steering operation is converted into a reciprocating linear motion of the rack shaft 5 by the rack-and-pinion mechanism 4. The steering shaft 3 in the present embodiment is formed by coupling a column shall 3a, an intermediate shaft 3b, and a pinion shaft 3c to each other. The reciprocating linear motion of the rack shaft 5 caused in accordance with the rotation of the steering shaft 3 is transmitted to knuckles (not shown) via tie rods 6 that are connected to respective ends of the rack shaft 5. As a result, the steered angle of steered wheels 7, that is, the travelling direction of a vehicle is changed.

The EPS 1 includes an EPS actuator 10 and an electronic control unit (ECU) 11. The EPS actuator 10 functions as a steering force assisting device that applies assist force for assisting a steering operation to a steering system. The ECU 11 functions as control means for controlling an operation of the EPS actuator 10.

The EPS actuator 10 in the present embodiment is formed as a so-called column-type EPS actuator in which a motor 12 that functions as a driving source is drivably coupled to the column shaft 3a via a speed reduction mechanism 13. In the present embodiment, a brushless motor that rotates on the basis of three-phase (U, V, W) driving electric power is employed as the motor 12. In the EPS actuator 10, the rotation speed of the motor 12 is reduced and the rotation with the reduced speed is transmitted to the column shaft 3a. In this way, the EPS actuator 10 applies assist force based on the motor torque to the steering system.

A torque sensor 14 is connected to the ECU 11. The ECU 11 detects a steering torque t that is transmitted to the steering shaft 3 based on a signal output from the torque sensor 14. The ECU 11 in the present embodiment receives a vehicle speed V that is detected by a vehicle speed sensor 15 and a steering angle θs that is detected by a steering sensor (steering angle sensor) 16. The ECU 11 computes a target assist force that should be applied to the steering system based on these state quantities, and supplies driving electric power so that a motor torque corresponding to the target assist force is generated. In this way, the ECU 11 controls the operation of the EPS actuator 10 that uses the motor 12 as a driving source, that is, the assist force that is applied to the steering system (power assist control).

Figure 2:
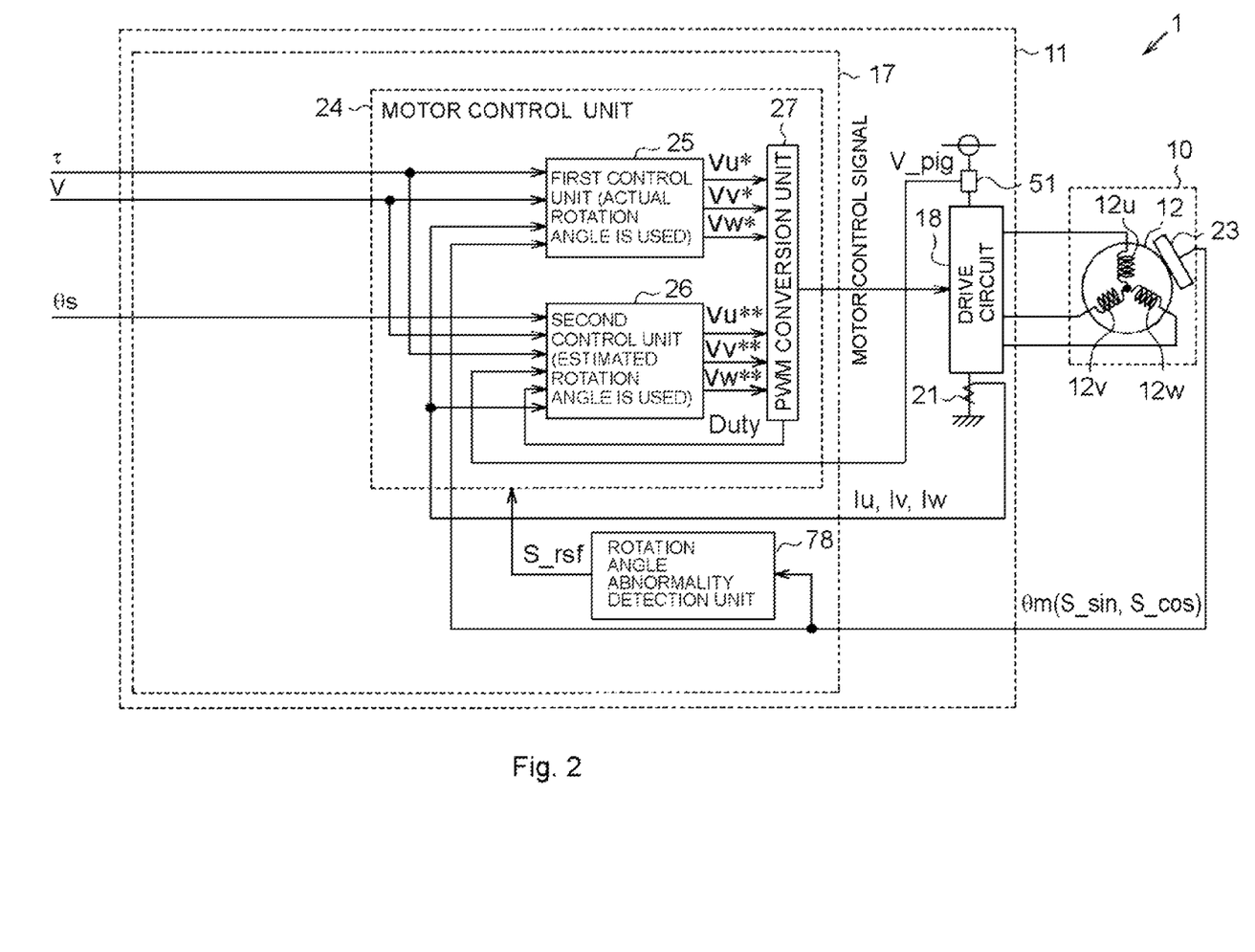
FIG. 2 is a block diagram showing the electrical configuration of the EPS.

Next, the electrical configuration of the EPS in the present embodiment will be described. FIG 2 is a control block diagram of the EPS in the present embodiment. The ECU 11 includes a microcomputer 17, and a drive circuit 18. The microcomputer 17 may function as motor control signal output means for outputting a motor control signal. The drive circuit 18 supplies three-phase driving electric power to the motor 12 based on the motor control signal that is output from the microcomputer 17.

Control blocks described below are realized by computer programs that are executed by the microcomputer 17. The microcomputer 17 detects each of the above-described state quantities with a predetermined sampling period, and executes the computation processes indicated in each control block with a predetermined period. In this way, the microcomputer 17 produces motor control signals.

As the drive circuit 18 in the present embodiment, a known PWM inverter in which a pair of switching elements connected in series is used as a base unit (switching arm) is employed. In the drive circuit 18, three switching arms that correspond to respective phase motor coils 12u, 12v, 12w are connected in parallel. That is, a motor control signal that is output from the microcomputer 17 defines the on/off state (duty ratio of each phase switching arm) of each of the phase switching elements that constitute the drive circuit 18. The drive circuit 18 is actuated upon reception of the motor control signal and supplies three-phase driving electric power based on a power supply voltage V_pig that is applied to the drive circuit 18.

The ECU 11 is provided with a current sensor 21 that is used to detect respective phase current values Iu, Iv, Iw of the motor 12. The current sensor 21 in the present embodiment has shunt resistance that is connected to the low potential side (ground side) of each of the switching arms that constitute the drive circuit 18. The microcomputer 17 in the present embodiment detects the phase current values Iu, Iv, Iw that are values of currents flowing through the respective phase motor coils 12u, 12v, 12w based on an output signal (inter-terminal voltage of the shut resistance) from the current sensor 21.

The microcomputer 17 in the present embodiment detects a rotation angle (electric angle) θm of the motor 12 based on an output signal from a motor resolver 23. In the present embodiment, as the motor resolver 23, there is employed a coil-type resolver that outputs, as sensor signals, two-phase sinusoidal-wave signals (a sine signal S_sin and a cosine signal S_cos) of which the amplitudes change in accordance with the actual rotation angle (electric angle) of the motor 12. The microcomputer 17 in the present embodiment produces a motor control signal that is output to the drive circuit 18 by executing current feedback control based on the respective phase current values Iu, Iv, Iw and the rotation angle θm of the motor 12.

More specifically, in the present embodiment, a motor control unit 24 of the microcomputer 17 includes a first control unit 25, a second control unit 26, and a PWM conversion unit 27. The first control unit 25 and the second control unit 26 compute phase voltage command values Vu*, Vv*, Vw*, and phase voltage command values Vu, Vv, Vw**, respectively, which should be applied to the respective phases of the motor 12 through execution of current control on the rotating coordinate system. The PWM conversion unit 27 converts the phase voltage command values to a motor control signal. The microcomputer 17 in the present embodiment outputs the motor control signal produced by the motor control unit 24 to the drive circuit 18.

Figure 3:
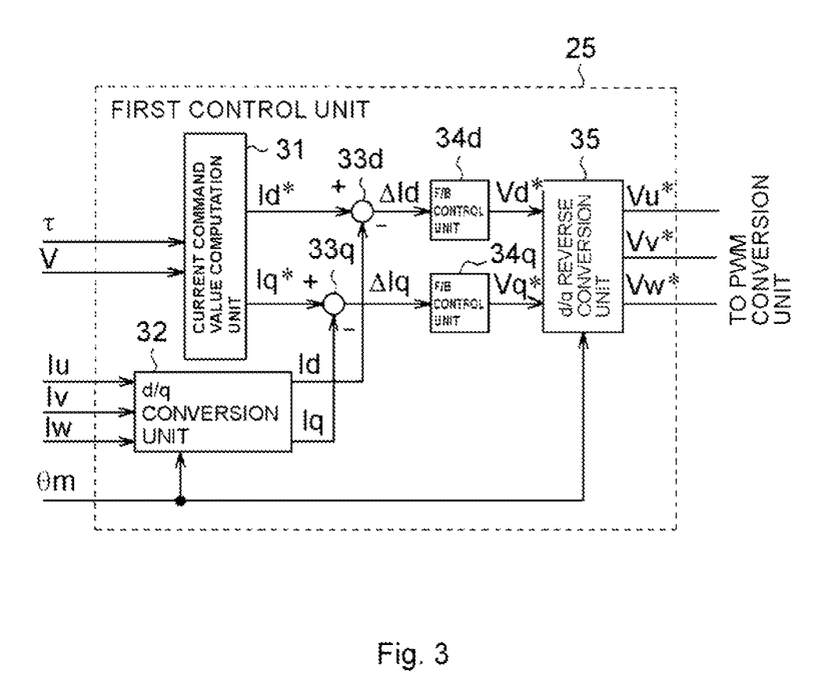
FIG. 3 is a diagram schematically showing the configuration of a first control unit.

As shown in FIG. 3, the first control unit 25 includes a current command value computation unit 31 that computes a current command value corresponding to the target assist force based on the steering torque τ and die vehicle speed V that are detected as described above. The first control unit 25 further includes a d/q conversion unit 32, and the d/q conversion unit 32 computes a d-axis current value Id and a q-axis current value Iq by mapping the respective phase current values Iu, Iv, Iw on d/q coordinate system based on the rotation angle θm that is detected by the motor resolver 23. The first control unit 25 executes current feedback control on the rotating coordinate system (d/q coordinate system) that rotates in accordance with the actual rotation angle θm of the motor 12. In this way, the first control unit 25 computes the phase voltage command values Vu*, Vv*, Vw* that indicate the voltages that should be applied to the respective phases of the motor 12.

That is, the current command value computation unit 31 computes a q-axis current command value Iq* as a current command value. Specifically, the current command value computation unit 31 computes the q-axis current command value Iq* with which a larger assist force is generated as the received steering torque τ is larger or the received vehicle speed V is lower. A d-axis current command value Id* is fixed to 0 (Id*=0). Then, the d-axis current command value Id* and the q-axis current command value Iq* are input into subtractors 33d, 33q together with the d-axis current value Id aid the q-axis current value Iq that are output from the d/q conversion unit 32, respectively.

Next current deviations ΔId, ΔIq of the respective axes that are computed by the subtractors 33d, 33q are input into F/B control units (feedback control units) 34d, 34q, respectively. The feedback control units 34d, 34q execute feedback control computations based on the received current deviations ΔId, ΔIq and predetermined feedback gains, respectively. In this way, the feedback control units 34d, 34q compute a d-axis voltage command value Vd* and a q-axis voltage command value Vq* that are voltage command values of the d/q coordinate system, respectively.

Specifically, the F/B control units 34d, 34q compute proportional components that are obtained by multiplying the received current deviations ΔId, ΔIq by proportional gains, and integral components that are obtained by multiplying the integral values of the current deviations ΔId, ΔIq by integral gains. Then, the f/B control units 34d, 34q produce the d-axis voltage command value Vd* and the q-axis voltage command value Vq*, respectively, by adding the corresponding proportional component and integral component together.

Next, the d-axis voltage command value Vd* and the q-axis voltage command value Vq* are mapped on a three-phase (U, V, W) alternating-current coordinates by a d/q reverse conversion unit 35. Then, the first control unit 25 outputs the phase voltage command values Vu*, Vv*, Vw* that are obtained through reverse conversion executed by the d/q reverse conversion unit 35 to the PWM conversion unit 27.

Figure 4:
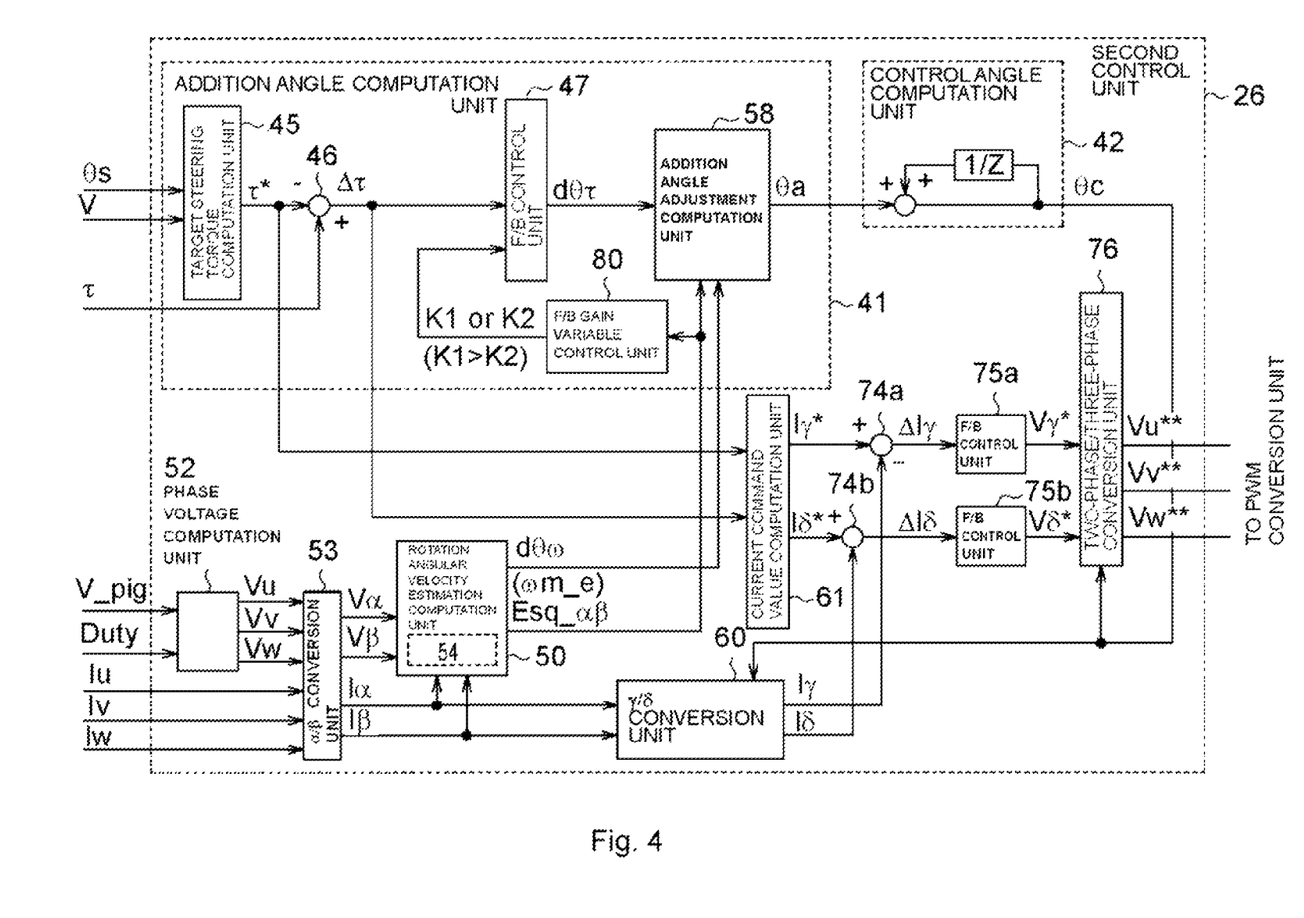
FIG. 4 is a diagram schematically showing the configuration of a second control unit.

As shown in FIG. 4, the second control unit 26 includes an addition angle computation unit 41 and a control angle computation unit 42. The addition angle computation unit 41 computes an addition angle θa that corresponds to an amount of change in the motor rotation angle (hereinafter, referred to as "motor rotation angle change amount") in each computation period. The control angle computation unit 42 computes a control angle θc as an imaginary motor rotation angle used in the control, by adding up the addition angles θa in each computation period. The second control unit 26 computes the phase voltage command values Vu, Vv, Vw** by executing current feedback control on a rotating coordinate system (γ/δ coordinate system) that rotates in accordance with the control angle θc.

Specifically, the addition angle computation unit 41 in the present embodiment receives the steering torque τ, the vehicle speed V, and the steering angle θs that are detected as described above. The addition angle computation unit 41 includes a target steering torque computation unit 45 that computes a target steering torque τ*, which corresponds to a target value of the steering torque τ, based on the steering angle θs of the steering wheel 2 and the vehicle speed V. The target steering torque τ* that is computed by the target steering torque computation unit 45 is input into a subtractor 46 together with the steering torque τ. The addition angle computation unit 41 in the present embodiment computes the addition angle θa based on a torque deviation Δτ that is obtained by subtracting the target steering torque τ* from the actual steering torque τ that is detected by the torque sensor 14.

That is, in the EPS that applies assist force based on the motor torque to the steering system, the target steering torque τ* is a parameter that corresponds to the motor torque (target torque) that should be generated by the motor 12, and the steering torque τ is a parameter that corresponds to the actual torque of the motor 12. That is, the difference between the target steering torque τ* and the actual steering torque τ (torque deviation Δτ) is a state quantity that indicates the excess or deficiency of the actual torque relative to the target torque. The addition angle computation unit 41 in the present embodiment computes the addition angle θa by executing torque feedback control so that the actual steering torque τ follows the target steering torque τ*.

Specifically, the torque deviation Δτ that is computed by the subtractor 46 is input into a F/B control unit 47. The F/B control unit 47 computes the sum of a proportional component that is obtained by multiplying the torque deviation Δτ by a proportional gain Kp_and an integral component that is obtained by multiplying the integral value of the torque deviation Δτ by an integral gain Ki_t, as a first change component dθτ of the motor rotation angle in each computation period.

In the present embodiment, the second control unit 26 includes a rotation angular velocity estimation computation unit 50 that functions as motor rotation angular velocity estimation means for estimating a motor rotation angular velocity. The addition angle computation unit 41 receives a motor rotation angular velocity ωm_e that is estimated by the rotation angular velocity estimation computation unit 50 as a second change component dθω of the motor rotation angle in each computation period. The addition angle computation unit 41 in the present embodiment computes the addition angle θa with the use of the second change component dθω based on the estimated motor rotation angular velocity ωm_e in addition to the first change component dθτ based on the torque deviation Δτ.

Specifically, the second control unit 26 receives an internal command value that corresponds to the phase voltage command values Vu*, Vv* Vw*, Vu, Vv, Vw** that are used when the PWM conversion unit 27 produces a motor control signal, that is, duty ratio. The ECU 11 in the present embodiment detects the power supply voltage V_pig that is applied to the drive circuit 18, using a voltage sensor 51 (see FIG. 2). The second control unit 26 includes a phase voltage computation unit 52 that computes the phase voltage values Vu, Vv, Vw of the motor 12 based on the detected power supply voltage V_pig and the duty ratio.

The phase voltage values Vu, Vv, Vw and the phase current value Iu, Iv, Iw of the motor 12, which are detected by the current sensor 21, are converted into an α-axis voltage value Vα and a β-axis voltage value Vβ and an α-axis current value Iα and a β-axis current value Iβ on a two-phase fixed coordinate system (α/β coordinate system) by an α/β conversion unit 53. Then, the rotation angular velocity estimation computation unit 50 in the present embodiment estimates the motor rotation angular velocity ωm_e based on the motor voltages indicated by the α-axis voltage value Vα and the β-axis voltage value Vp and the motor currents indicated by the α-axis current value Iα and the β-axis current value Iβ.

More specifically; the rotation angular velocity estimation computation unit 50 in the present embodiment includes a disturbance observer 54 that estimates induced voltages generated at the motor 12 as disturbances, based on a motor model.

Figure 5:
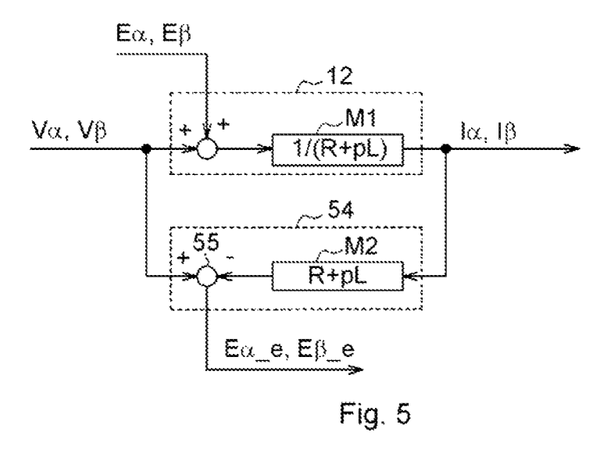
FIG. 5 is a block diagram schematically showing the configuration of a disturbance observer.

That is, in a block diagram shown in FIG 5, the motor 12 is expressed by a motor model M1 that produces motor currents Iα, Iβ based on the motor voltages Vα, Vβ and the induced voltages Eα, Eβ. Therefore, the disturbance observer 54 that outputs induced voltage estimated values Eα_e, Eβ_e is formed by a reverse motor model M2 that receives the motor currents Iα, Iβ, and a difference calculator 55 that receives the output from the reverse motor model M2 and the motor voltages Vα, Vβ. If the motor model M1 is expressed as "1/(R+pL)", the reverse motor model M2 is expressed as "R+pL" (where R denotes armature coil resistance, L denotes inductance, and p denotes differential operator). Then, the rotation angular velocity estimation computation unit 50 in the present embodiment estimates the motor rotation angular velocity ωm_e based on the induced voltage estimated values Eα_e, Eβ_e that are output from the disturbance observer 54.

That is the induced voltages Eα, Eβ on the α/β coordinate system are expressed by Equations 1, 2 indicated below, respectively. Note that, in each equation, "Ke" denotes an induced voltage constant, and "ωm" indicates a motor rotation angular velocity.

$$E\alpha = -Ke \times \omega m \times \sin\theta \quad \text{Equation 1}$$

$$E\beta = Ke \times \omega m \times \cos\theta \quad \text{Equation 2}$$

In addition, Equation 3 indicated below is obtained by solving Equations 1, 2 in terms of an angle "θ".

$$\theta = \arctan(-E\alpha/E\beta) \quad \text{Equation 3}$$

Accordingly, it is possible to estimate the motor rotation angle θm_e based on the induced voltage estimated values Eα_, Eβ_e that are output from the disturbance observer 54. The rotation angular velocity estimation computation unit 50 in the present embodiment computes the estimated motor rotation angular velocity ωm_e by differentiating the estimated value θm_e of the motor rotation angle.

Figure 6:
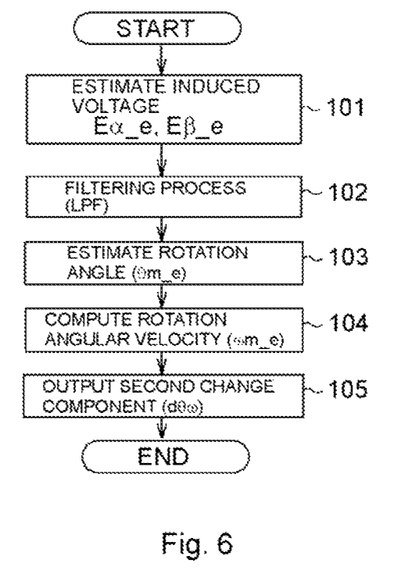
FIG. 6 is a flowchart showing the processes of rotation angular velocity estimation.

Specifically, as shown in a flowchart in FIG. 6, the rotation angular velocity estimation computation unit 50 estimates the induced voltage estimated values Eα_e, Eβ_e of the motor 12 using the disturbance observer 54 (step 101), and subjects the induced voltage estimated values Eα_e, Eβ_e to a filtering process (LPF: low-pass filter) (step 102). Next, the rotation angular velocity estimation computation unit 50 estimates the motor rotation angle θm_e based on the induced voltage estimated values Eα_e, Eβ_e according to Equation 3 (rotation angle estimation) (step 103). Then, the rotation angular velocity estimation computation unit 50 computes the estimated motor rotation angular velocity ωm_e by differentiating the motor rotation angle θm_e (rotation angular velocity estimation) (step 104).

Then, the rotation angular velocity estimation computation unit 50 in the present embodiment outputs the estimated motor rotation angular velocity ωm_e to the addition angle computation unit 41 as a second change component dθω of the motor rotation angle in each computation period (step 105).

As shown in FIG. 4, in the addition angle computation unit 41 in the present embodiment, the first change component dθτ of the motor rotation angle based on the torque deviation Δτ that is computed by the F/B control unit 47 and the second change component dθω of the motor rotation angle based on the estimated motor rotation angular velocity ωm_e that is computed by the rotation angular velocity estimation computation unit 50 are both input into an addition angle adjustment computation unit 58. In the present embodiment, the rotation angular velocity estimation computation unit 50 computes a square sum of the induced voltage estimated values Eα_e, Eβ_e that are output from the disturbance observer 54 (Esq_αβ=(Eα_e)^2+(Eβ_e)^2, and outputs the induced voltage square sum Esq_αβ to the addition angle adjustment computation unit 58. The addition angle computation unit 41 in the present embodiment changes the mode of computing the addition angle θa based on the value of the induced voltage square sum Esq_αβ.

Specifically, the addition angle adjustment computation unit 58 in the present embodiment compares the received induced voltage square sum Esq_αβ with a predetermined threshold E0. Then, if the induced voltage square sum Esq_αβ is equal to or lower than the predetermined threshold E0, the first change component dθτ based on the torque deviation Δτ is set as the addition angle θa (first computation mode:θa=dθτ).

On the other hand, if the induced voltage square sum Esq_αβ exceeds the predetermined threshold E0, the first change component dθτ based on the torque deviation Δτ is corrected by the estimated motor rotation angular velocity ωm_e. Specifically, the first change component dθτ based on the torque deviation Δτ and the second change component dθω based on the estimated motor rotation angular velocity ωm_e are added together. Then, the sum of the first change component dθτ and the second change component dθω is set as the addition angle θa (second computation mode; θa=dθτ+dθω).

That is, the motor rotation angular velocity that is obtained using one computation period as a base unit is equivalent to the motor rotation angle change amount in the one computation period. The estimation of the induced voltages based on the motor currents and the motor voltages with the use of the disturbance observer 54 is executed with a higher accuracy in a high-speed rotation region where the induced voltage increases.

On the basis of this, the addition angle adjustment computation unit 58 in the present embodiment determines whether the rotation state (rotation speed) of the motor 12 is within the high-speed rotation region in which it is possible to ensure the estimation accuracy at which the estimated motor rotation angular velocity ωm_e is used as the second change component dθω of the motor rotation angle, by comparing the induced voltage square sum Esq_αβ with the threshold E0. Only when the motor rotation speed is within the high-speed rotation region in which the required estimation accuracy is ensured, the second change component dθω based on the estimated motor rotation angular velocity ωm_e is used.

Figure 7:
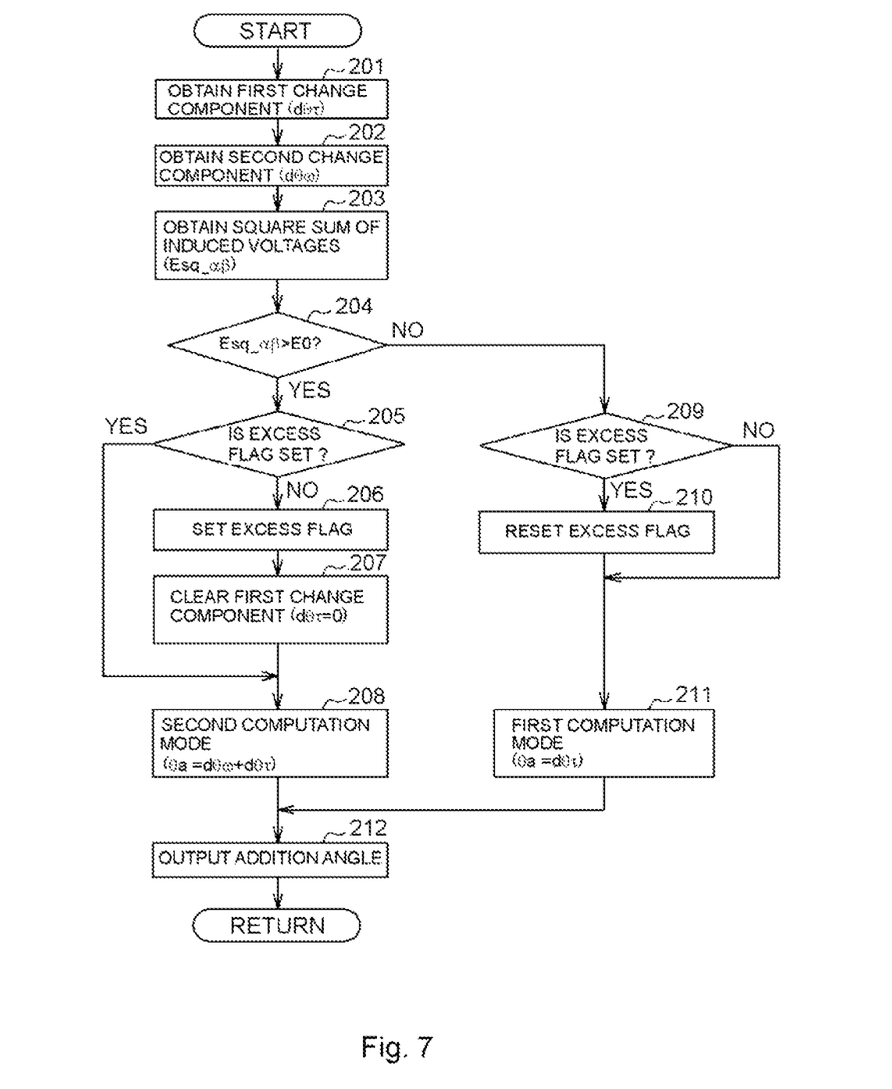
FIG. 7 is a flowchart showing the processes of addition angle adjustment computation.

Specifically, as shown in a flowchart in FIG. 7, first the addition angle adjustment computation unit 58 obtains the first change component dθτ based on the torque deviation Δτ, the second change component dθω based on the estimated motor rotation angular velocity ωm_e, and the induced voltage square sum Esq_αβ (step 201 to step 203).

Next, the addition angle adjustment computation unit 58 determines whether the induced voltage square sum Esq_αβ exceeds the threshold E0 (step 204). When the induced voltage square sum Esq_αβ exceeds the threshold E0 ("YES" in step 204), the addition angle adjustment computation unit 58 then determines whether an excess flag that indicates that the induced voltage square sum Esq_αβ exceeds the threshold E0 is set (step 205). If the excess flag is not set ("NO" in step 205), the addition angle adjustment computation units 58 sets the excess flag (step 206), and clears the value of the first change component dθτ obtained in step 201 (dθτ=0) (step 207).

If it is determined in step 205 that the flag is already set ("YES" in step 205), the processes in step 206 and step 207 are not executed.

If it is determined in step 204 that the induced voltage square sum Esq_αβ exceeds the threshold E0 ("YES" in step 204), the addition angle adjustment computation unit 58 adds the first change component dθτ based on the torque deviation Δτ and the second change component dθω based on the estimated motor rotation angular velocity ωm_e together irrespective of whether the excess flag is set. Then, the addition angle adjustment computation unit 58 computes the sum of the first change component dθτ and the second change component dθω as the addition angle θa (second computation mode: θa=dθτ+dθω) (step 208).

On the other hand, if it is determined in step 204 that the induced voltage square sum Esq_αβ is equal to or lower than the threshold E0 ("NO" in step 204), the addition angle adjustment computation unit 58 determines whether the excess flag is set (step 209). If the excess flag is set ("YES" in step 209), the addition angle adjustment computation unit 58 resets the excess flag (step 210). If the excess flag is not set ("NO" in step 209), the process in step 210 is not executed. Then, the addition angle adjustment computation unit 58 computes the first change component dθτ obtained in step 201 as the addition angle θa (first computation mode: θa=dθτ) (step 211).

Then, the addition angle adjustment computation unit 58 in the present embodiment outputs the addition angle θa that is computed in step 208 or step 211 to the outside (step 212).

The first change component dθτ is cleared (step 207) in the first computation period in which the addition angle θa is computed with the use of the second change component dθω based on the estimated motor rotation angular velocity ωm_e ("YES" in step 204 and "NO" in step 205) for the following reason. That is, the first change component dθτ reflects the state of the immediately preceding computation period in which the second change component dθω is not used. In the present embodiment, it is therefore possible to compute the addition angle with a high accuracy irrespective of the motor rotation state.

As shown in FIG. 4, the addition angle computation unit 41 outputs the thus computed addition angle θa to the control angle computation unit 42. The control angle computation unit 42 retains the immediately preceding value of the control angle θc that is computed in the immediately preceding computation period in a storage region (not shown), and adds the addition angle θa to the immediately preceding value to compute the new control angle θc. Then, the control angle computation unit 42 updates the immediately preceding value that is stored in the storage region to the new control angle θc to compute the control angle θc through addition of the addition angle θa in each computation period.

in the second control unit 26, the control angle θc as the thus computed imaginary motor rotation angle used in the control is input into a γ/δ conversion unit 60 together with the α-axis current value Iα and the β-axis current value Iβ of the two-phase fixed coordinate system (α/β coordinate system), which are output from the α/β conversion unit 53. Then, the γ/δ conversion unit 60 maps the α-axis current value Iα and the β-axis current value Iβ on the rotating coordinate system that rotates in accordance with the control angle θc, that is, the orthogonal coordinates of the γ/δ coordinate system to compute a γ-axis current value Iγ and a δ-axis current value Iδ as the actual current values of the γ/δ coordinate system.

In the γ/δ coordinate system that is an imaginary rotating coordinates used in the control, the γ-axis coincides with the d-axis when the deviation (load angle) between the control angle θc and the actual motor rotation angle θm is 0.

The second control unit 26 includes a current command value computation unit 61 that computes a γ-axis current command value Iγ* and a δ-axis current command value Iδ* as current command values of the γ/δ coordinate system. The current command value computation unit 61 computes the γ-axis current command value Iγ* and the δ-axis current command value Iδ* based on the torque deviation Δτ that is computed by the addition angle computation unit 41 and the target steering torque τ*.

Figure 8:
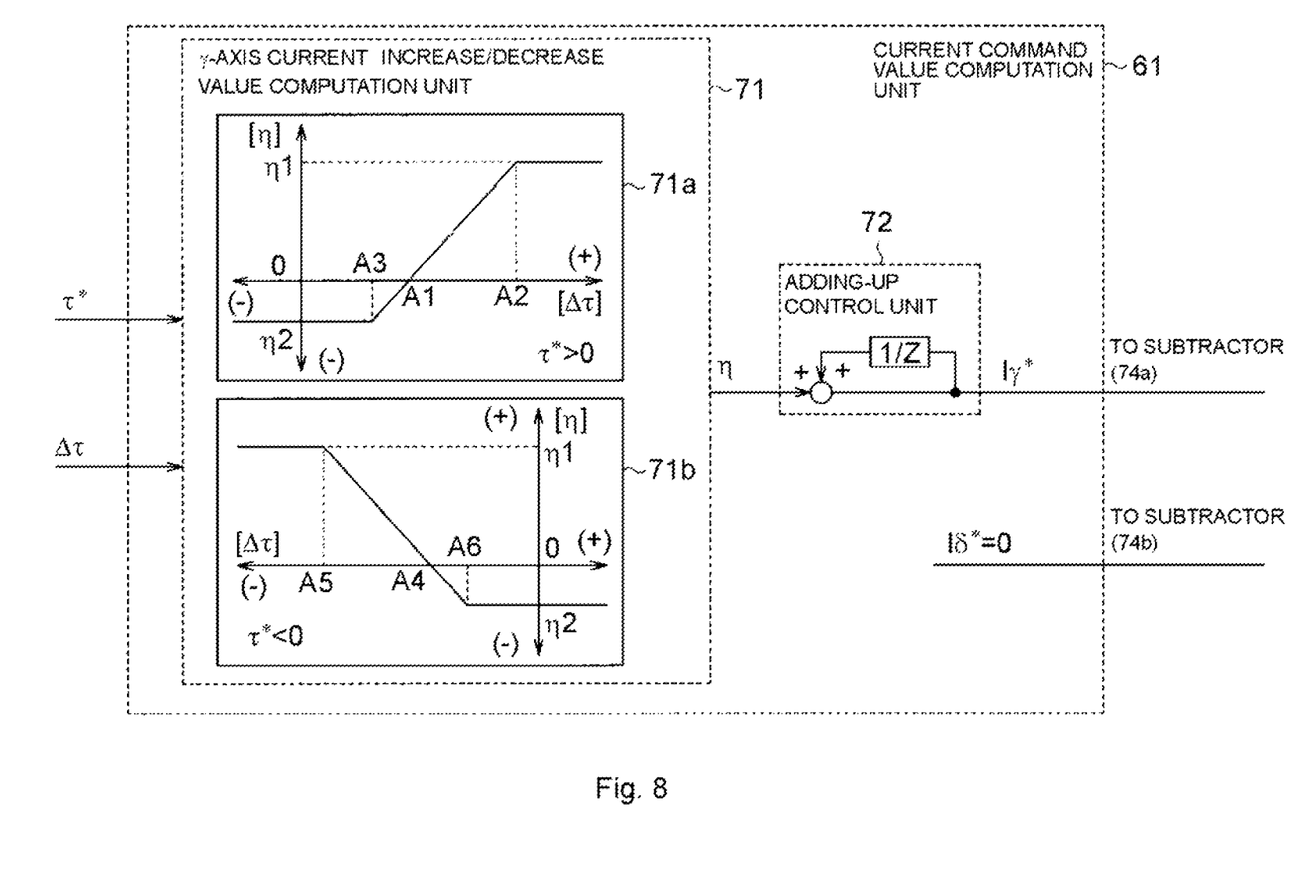
FIG. 8 is a view schematically showing the con figuration of a current command value computation unit of the second control unit.

Specifically, as shown in FIG. 8, the current command value computation unit 63 in the present embodiment includes a γ-axis current increase/decrease value computation unit 71 and an adding-up control unit 72. The γ-axis current increase/decrease value computation unit 71 computes an increase/decrease value of the γ-axis current command value Iγ* (γ-axis current increase/decrease value η) in each computation period based on the torque deviation Δτ between the target steering torque τ* and the actual steering torque τ. The adding-up control unit 72 adds up the received γ-axis current increase/decrease values η in each computation period.

The γ-axis current increase/decrease value computation unit 71 in the present embodiment has two maps 71a, 71b in which the torque deviation Δτ and the γ-axis current increase/decrease value η are associated with each other. Specifically, the first map 71a is formed for the case where the sign (direction) of the target steering torque τ* is positive (τ*>0), whereas the second map 71b is formed for the case where the sign (direction) of the target steering torque τ* is negative (τ*<0). When the target steering torque τ* is 0, the sign of the target steering torque τ* that is immediately before it becomes 0 is used. The γ-axis current increase/decrease value computation unit 71 computes the γ-axis current increase/decrease value η in each amputation period based on the torque deviation Δτ while switching the map to be referenced, based on the sign of the received target steering torque τ*.

That is, the state where the torque deviation Δτ is a positive value when the target steering torque τ* is a positive value and the state where the torque deviation Δτ is a negative value when the sign of the target steering torque τ* is a negative value indicate that the actual torque is insufficient relative to the target toque that should be generated by the motor 12. On the other hand, the case where the torque deviation Δτ is a negative value when the target torque τ* is a positive value and the case where the torque deviation Δτ is a positive value when the target steering torque τ* is a negative value indicate that the actual torque is excessive relative to the target torque that should be generated by the motor 12. The γ-axis current increase/decrease value computation unit 71 in the present embodiment computes the γ-axis current increase/decrease value q in each computation period based on the excess or deficiency of the actual torque relative to the target torque that should be generated by the motor, which is indicated by the torque deviation Δτ.

The adding-up control unit 72 in the present embodiment retains the control output in the immediately preceding computation period, that is, the immediately preceding value of the γ-axis current command value I γ* in the storage region (not shown). Then, the adding-up control unit 72 adds the received γ-axis current increase/decrease value η to the immediately preceding value to compute the new γ-axis current command value Iγ*, and updates the immediately preceding value that is retained in the storage region to the new γ-axis current command value Iγ*.

The current command value computation unit 61 in the present embodiment sets the control output from the adding-up control unit 72, that is, the sum of the γ-axis current increase/decrease values η, as the γ-axis current command value Iγ*.

As shown in FIG. 4, the γ-axis current command value Iγ* that is computed by the current command value computation unit 61 as described above is input into a subtractor 74a together with the γ-axis current value Iγ. Similarly, the δ-axis current command value Iδ* is input into a subtractor 74b together with the δ-axis current value Iδ. In the present embodiment, the δ-axis current command value Iδ* is fixed to 0 (Iδ*=0). The current deviations ΔIγ, ΔIδ that are computed by the subtractors 74a, 74b are input into F/B control units 75a, 75b, respectively.

Next, the F/B control units 75a, 75b compute a γ-axis voltage command value Vγ* and a δ-axis voltage command value Vδ* that are voltage command values of the γ/δ coordinate system by executing feedback control based on the current deviations ΔIγ, ΔIδ and predetermined feedback gains (proportional: P, integral: I), respectively. Because the mode of the feedback control computations that are executed by the F/B control units 75a, 75b are similar to those of the F/B control units 34d, 34q in the first control unit 25, detailed description thereof will be omitted.

Further, the γ-axis voltage command value Vγ* and the δ-axis voltage command value Vδ* are mapped on the three-phase (U, V, W) alternating-current coordinates by a two-phase/three-phase conversion unit 76. Then, the second control unit 26 outputs the phase voltage command values Vu, Vv, Vw produced by the two-phase/three-phase conversion unit 76 to the PWM conversion unit 27**.

As shown in FIG 2, the microcomputer 17 in the present embodiment includes a rotation angle abnormality detection unit 78 that detects an abnormality of the rotation angle θm that is detected by the motor resolver 23. Specifically, the rotation angle abnormality detection unit 78 in the present embodiment determines whether the square sum of a sine signal S_sin and a cosine signal S_cos that are output from the motor re-solver 23 is within a proper range. Based on the result of detection, the rotation angle abnormality detection unit 78 detects an abnormality of the rotation angle θm used as the actual rotation angle of the motor 12.

Further, in the present embodiment, the result of abnormality detection by the rotation angle abnormality detection unit 78 is input into the motor control unit 24 as a rotation angle abnormality detection signal S_rsf. Then, the motor control unit 24 in the present embodiment outputs a motor control signal based on the phase voltage command values Vu*, Vv*, Vw* that are computed by the first control unit 25 when there is no abnormality in the rotation angle θm, and outputs a motor control signal based on the phase voltage command values Vu, Vv, Vw that are computed by the second control unit 26** when there is an abnormality in the rotation angle θm.

That is, the second control unit 26 computes the phase voltage command values Vu, Vv, Vw using the control angle θm that is an imaginary motor rotation angle used in the control, without using the rotation angle θm that is detected by the motor resolver 23, which is an actual rotation angle of the motor 12. The ECU 11 in the present embodiment produces the motor control signal based on the phase voltage command voltage values Vu, Vv, Vw that are computed by the second control unit 26. Thus, it Is possible to stably continue the motor control even after an abnormality is detected in the rotation angle θm.

Torque feedback gain variable control will be described below. As shown in FIG. 4, the addition angle computation unit 41 in the present embodiment Includes a F/B gain variable control unit 80. The F/B control unit 47 executes the torque feedback control based on the gain (feedback gain) that is computed by the F/B gain variable control unit 80.

Specifically, the F/B gain variable control unit 80 outputs the combination of a proportional gain Kp_J that is used for computation of the proportional component and an integral gain Ki_t that is used for computation of the integral component to the F/B control unit 27 as (a set of) feedback gains. Then, the F/B gain variable control unit 80 in the present embodiment computes one of two different feedback gains K1, K2 depending on the mode of computation of the addition angle θa in the addition angle adjustment computation unit 58.

In the present embodiment, the F/B gain variable control unit 80 receives the Induced voltage square sum Esq_αβ that is computed by the rotation angular velocity estimation computation unit 50. Then, the F/B gain variable control unit 80 determines the mode of computation of the addition angle θa by comparing the induced voltage square sum Esq_αβ with the threshold E0, like the addition angle adjustment computation unit 58.

Figure 9:
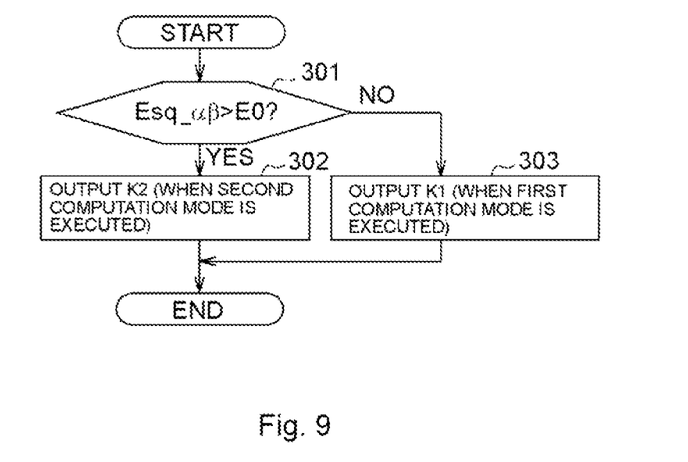
FIG. 9 is a flowchart showing the processes of torque feedback gain variable control.

That is, as shown in the flowchart in FIG. 9, the F/B gain variable control unit 80 determines whether the induced voltage square sum Esq_αβ exceeds the threshold E0 (step 301). If the induced voltage square sum Esq_αβ exceeds the threshold E0 (Esq_αβ>E0) ("YES" in step 301), the F/B gain variable control unit 80 determines that the computation of the addition angle θa is the "second computation mode" in which a value obtained by correcting the first change component dθτ based on the torque deviation Δτ by the estimated motor rotation angular velocity ωm_e is set as the addition angle θa, and computes the feedback gain K2 (step 302).

On the other hand, if the Induced voltage square sum Esq_αβ is equal to or lower than the threshold E0 (Esq_αβ≤0) ("NO" in step 301), the F/B gain variable control unit 80 determines that the mode of computation of the addition angle is the "first computation mode" in which the first change component dθτ based on the torque deviation Δτ is set as the addition angle θa. Then, in the first computation mode, the F/B gain variable control unit 80 computes the feedback gain K1 at which the response is higher than that at the feedback gain K2 used in the second computation mode (K1>K2) (step 303).

Specifically, when the two feedback gains K1, K2 are compared with each other, the integral gain Ki_t of the feedback gain K1 used in the first computation mode is set higher than that of the feedback gain K2 used in the second computation mode. In the present embodiment, the proportional gains Kp_t of the two feedback gains K1, K2 are set equal to each other. In the present embodiment the response to the torque feedback control is optimized. Thus, it is possible to stably execute the resolver-less control while maintaining quietness.

According to the present embodiment described above, the following effects are obtained.

1) The F/B control unit 47 computes the first change component dθτ by executing the torque feedback control based on the torque deviation Δτ using the feedback gain that is computed by the F/B gain variable control unit 80. Also, the F/B gain variable control unit 80 computes one of the two different feedback gains K1, K2 that correspond to the first computation mode in which the first change component dθτ is used as the addition angle θa and the second computation mode in which the value obtained by correcting the first change component dθτ by the estimated motor rotation angular velocity ωm_e is used as the addition angle θa, respectively. Then, the feedback gain K1 used in the first computation mode is set such that the response is higher than that at the feedback gain K2 used in the second computation mode.

With the above-described configuration, in the second mode in which the torque deviation is small, generation of self-excited vibration due to excessive response is suppressed, whereas in the first mode in which a large torque deviation is likely to occur, the response is improved to improve the followability. Even in a case where the deviation between the control angle and the actual rotation angle increases beyond the range of deviations at which the rotor of the motor 12 is maintained at the rotation position corresponding to the control angle (control angle deviated state), it is possible to promptly recover from such a state. As a result, it is possible to more stably execute the resolver-less control while maintaining quietness, irrespective of whether the correction with the use of the estimated motor rotation angular velocity ωm_e is executed.

In the second computation mode, the addition angle adjustment computation unit 58 sets the sum of the first change component dθτ based on the torque deviation Δτ and the second change component dθω based on the estimated motor rotation angular velocity ωm_e as the addition angle θa (θa=dθτ+dθω).

That is, the motor rotation angular velocity that is obtained using one computation period as a base unit is equivalent to the amount of change in the motor rotation angle in the one computation period. Therefore, the first change component dθτ in the above-described configuration corresponds to the amount of change in the motor rotation angular velocity, and large fluctuations are less likely to occur in the value. Accordingly, if the above-described configuration 1) is applied to this configuration, more significant effects are obtained.

The above-described embodiment may be modified as follows.

In the above-described embodiment, the invention is applied to a so-called column-type electric power steering system (EPS) 1. A system to which the invention is applied is not limited to the column-type electric power steering system 1. For example, the invention may be applied to a so-called pinion-type electric power steering system and a so-called rack assist-type electric power steering system.

Also, the invention may be applied to a motor control unit that is used for a system other than an electric power steering system. For example, the invention may be applied to a vehicle steering system that includes an electric actuator such as a transmission ratio variable device. In the above-described embodiment, the torque deviation Δτ between the target steering torque τ* and the actual steering torque τ is used as the "torque deviation between the target torque that should be generated by the motor and the actual torque". However, when the invention is applied to a system other than an electric power steering system, the torque deviation between the target torque and the actual torque may be used.

In the above-described embodiment, the integral gain Ki_t of the feedback gain K1 used in the first computation mode is set higher than that of the feedback gain K2 used in the second computation mode. Similarly, the proportional gain Kp_t of the feedback gain K1 used in the first computation mode may be higher than that of the feedback gain K2 used in the second computation mode. The two feedback gains K1, K2 may be different in only proportional gain Kp_t from each other.

In the above-described embodiment, the F/B gain control unit 47 executes the PI control (proportional; P, integral: I) as the torque feedback control. However, the invention is not limited to this. For example, the differential gain Kd_t may be variable in the derivative control (D) such as the PID control.

In this case as well, whether the proportional gain Kp_t is variable and whether the integral gain Ki_t is variable may be set as appropriate.

In the above-described embodiment, the F/B gain variable control unit 80 determines the mode of computation of the addition angle θa by comparing the induced voltage square sum Esq_αβ* with the threshold E0, like the addition angle adjustment computation unit 58. However, the invention is not limited to this, and another configuration may be employed. For example, the addition angle adjustment computation unit 58 may output a signal indicating the computation mode.

In the above-described embodiment, in the second computation mode, the sum of the first change component dθτ based on the torque deviation Δτ and the second change component dθω based on the estimated motor rotation angular velocity ωm_e is set as the addition angle θa(θa=dθτ+dθω). However, the invention is not limited to this, and the method of correction using the estimated motor rotation angular velocity ωm_e is not limited to this.

What is claimed is

1. A motor control unit that includes motor control signal output means for outputting a motor control signal, and a drive circuit that supplies three-phase driving electric power to a motor based on the motor control signal, the motor control signal output means computing an addition angle that corresponds to an amount of change in a motor rotation angle in each computation period and outputting the motor control signal by executing current control on a rotating coordinate system that rotates in accordance with a motor rotation angle used in the control, the motor rotation angle being obtained through addition of the addition angle, and the motor control unit having a first computation mode in which a value obtained by executing torque feedback control based on a torque deviation between a target torque that is to be generated by the motor and an actual torque is used as the addition angle, and a second computation mode in which a value obtained by correcting the value obtained by executing the torque feedback control, based on an estimated motor rotation angular velocity is used as the addition angle, wherein comprising, the motor control signal output means changes a gain of the torque feedback control depending on whether a mode of computation of the addition angle is the first computation mode or the second computation mode.

2. The motor control unit according to claim 1, wherein the motor control signal output means changes the gain such that a response in the first computation mode is higher than a response in the second computation mode.

3. An electric power steering system, characterized by comprising the motor control unit according to claim 1.

* * * * *